US012468002B2

(12) United States Patent
Jung et al.

(10) Patent No.: US 12,468,002 B2
(45) Date of Patent: Nov. 11, 2025

(54) ELECTRONIC DEVICE AND POSITIONING SYSTEM FOR DETERMINING CHANNEL FOR PERFORMING INDOOR POSITIONING SYSTEM

(71) Applicant: SAMSUNG ELECTRONICS CO., LTD., Suwon-si (KR)

(72) Inventors: Heelok Jung, Suwon-si (KR); Seonhee Kim, Suwon-si (KR); Junghun Kim, Suwon-si (KR); Hyoyoung Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 17/977,546

(22) Filed: Oct. 31, 2022

(65) Prior Publication Data

US 2023/0113597 A1    Apr. 13, 2023

Related U.S. Application Data

(63) Continuation of application No. PCT/KR2022/013634, filed on Sep. 13, 2022.

(30) Foreign Application Priority Data

Oct. 13, 2021   (KR) .................. 10-2021-0136096
Nov. 19, 2021   (KR) .................. 10-2021-0160285

(51) Int. Cl.
  *G01S 5/00*    (2006.01)
(52) U.S. Cl.
  CPC ............ *G01S 5/0009* (2013.01); *G01S 5/012* (2020.05)
(58) Field of Classification Search
  CPC ............................. G01S 5/0009; G01S 5/012
  See application file for complete search history.

(56) References Cited

U.S. PATENT DOCUMENTS 9,794,942 B1 * 10/2017 Arrakoski ......... H04W 72/0473
10,440,678 B2 * 10/2019 Hedley ................. G01S 5/0294
(Continued)

FOREIGN PATENT DOCUMENTS

KR         10-0811887 B1    3/2008
KR     10-2011-0122703 A    11/2011
(Continued)

OTHER PUBLICATIONS

International Search Report & Written Opinion (PCT/ISA/210 & PCT/ISA/237) issued by the International Searching Authority on Dec. 13, 2022 in corresponding International Application No. PCT/KR2022/013634.

*Primary Examiner* — Khai M Nguyen
(74) *Attorney, Agent, or Firm* — Sughrue Mion, PLLC

(57) ABSTRACT

An electronic device according to various embodiments may include a communication interface configured to be electrically connected to at least one communication device establishing a communication channel with a mobile terminal and a processor, wherein the processor may be configured to identify a plurality of communication channels for performing data exchange through a plurality of wireless communications supported by the mobile terminal, identify one of a capacity of the plurality of communication channels or a precision of the plurality of communication channels, and determine a communication channel to be used for determining a location of the mobile terminal, based on an identification result. The plurality of communication channels may include at least two channels for performing data exchange through different types of wireless communication.

24 Claims, 9 Drawing Sheets

(56) References Cited

U.S. PATENT DOCUMENTS

| | | |
|---|---|---|
| 10,997,474 B2 | 5/2021 | Munir et al. |
| 11,595,931 B2 * | 2/2023 | Bao .................. H04W 76/14 |
| 2010/0197317 A1 | 8/2010 | Sadek et al. |
| 2011/0269477 A1 | 11/2011 | Annamalai et al. |
| 2012/0214515 A1 | 8/2012 | Davis et al. |
| 2014/0213256 A1 * | 7/2014 | Meylan ................ H04W 48/18 |
| | | 455/436 |
| 2015/0181549 A1 * | 6/2015 | Batada .................. H04W 4/33 |
| | | 455/456.1 |
| 2022/0232349 A1 * | 7/2022 | Baek .................. H04W 4/029 |

FOREIGN PATENT DOCUMENTS

| | | |
|---|---|---|
| KR | 10-1247817 B1 | 3/2013 |
| KR | 10-2015-0113018 A | 10/2015 |
| KR | 10-1603712 B1 | 3/2016 |
| KR | 10-2016-0135584 A | 11/2016 |
| KR | 10-1890283 B1 | 8/2018 |
| KR | 10-1924892 B1 | 12/2018 |
| KR | 10-1945417 B1 | 2/2019 |
| KR | 10-2020-0137414 A | 12/2020 |
| WO | 2011/139841 A2 | 11/2011 |

\* cited by examiner

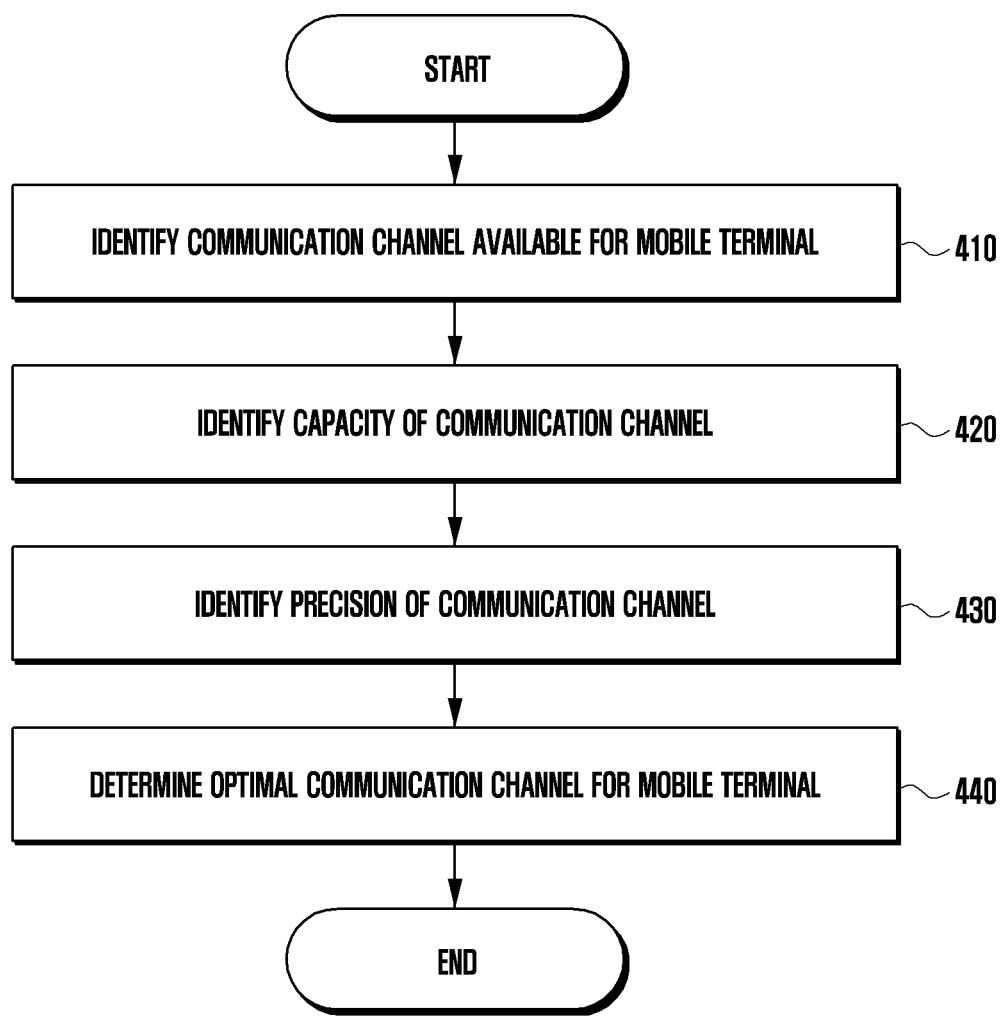

FIG. 5B
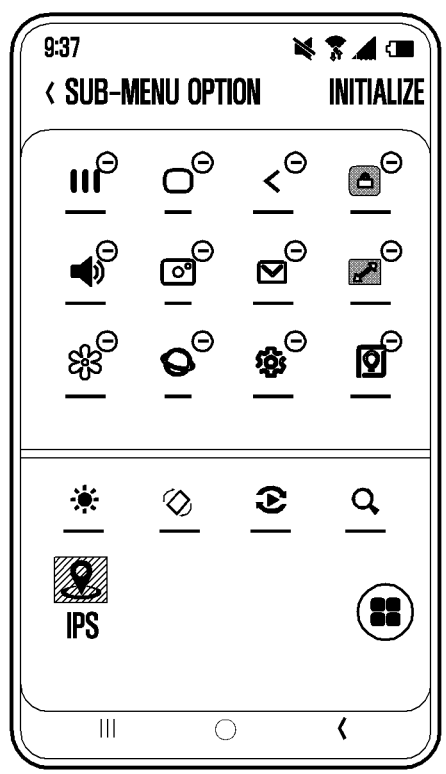
(a)
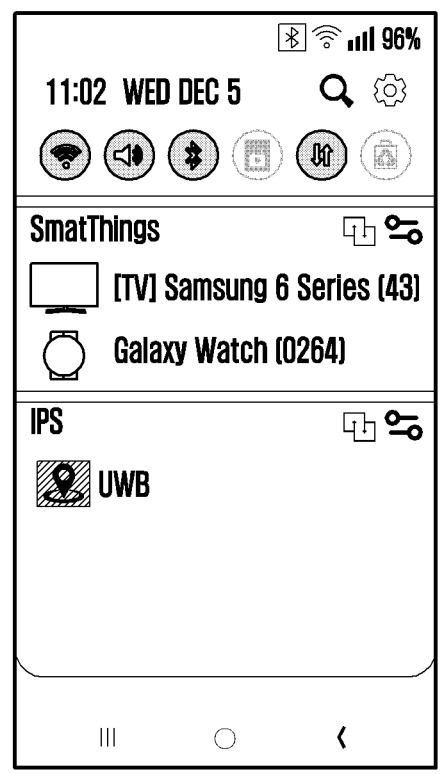
(b)

FIG. 6B
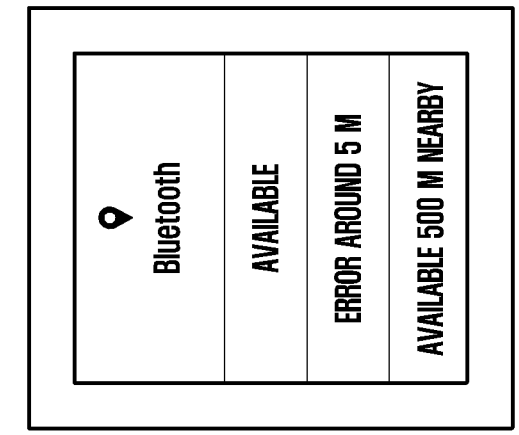
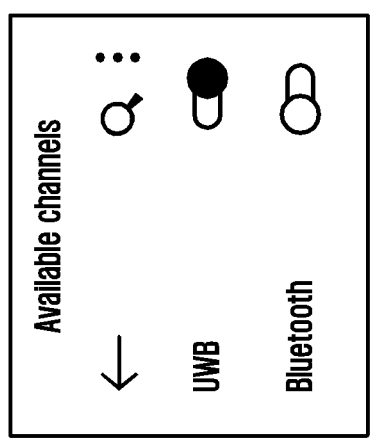
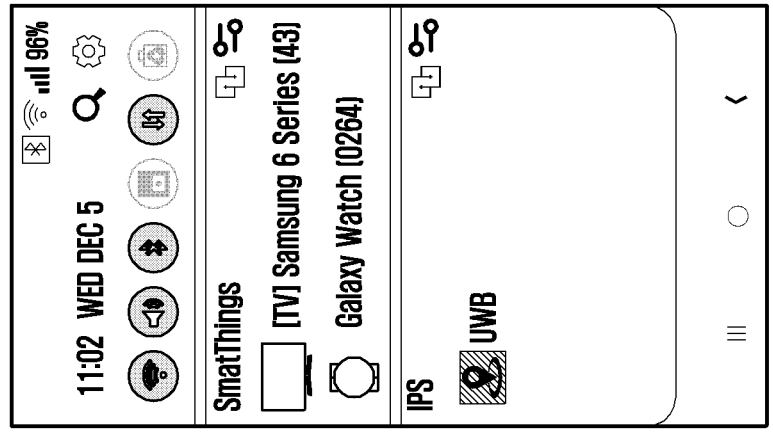

ELECTRONIC DEVICE AND POSITIONING SYSTEM FOR DETERMINING CHANNEL FOR PERFORMING INDOOR POSITIONING SYSTEM

CROSS REFERENCE TO RELATED APPLICATION

This application is a by-pass continuation of International Application No. PCT/KR2022/013634, filed on Sep. 13, 2022, in the Korean Intellectual Property Receiving Office, which claims priority from Korean Patent Application No. 10-2021-0136096, filed on Oct. 13, 2021, in the Korean Intellectual Property Office, and Korean Patent Application No. 10-2021-0160285, filed on Nov. 19, 2021, in the Korean Intellectual Property Office, the disclosures of which are incorporated in their entireties.

TECHNICAL FIELD

Various embodiments disclosed herein relate to an electronic device and a positioning system for determining a channel for implementing an indoor positioning system. Specifically, various embodiments disclosed herein relate to a server module for determining a communication channel to be used for a system in the system for tracking the indoor location of a mobile terminal and a positioning system including the server module.

BACKGROUND ART

Various services may be provided using a location-based service of a mobile terminal. Generally, a method for determining the location of a wireless terminal using a global positioning system (GPS) is used. However, since the strength of a satellite signal is weak or a satellite is not received in an indoor area, such as the inside of a building, a basement, or a tunnel, this method has difficulty in detecting the accurate location of a mobile terminal. Therefore, to solve difficulties of indoor positioning using a satellite signal, studies on a technique for determining the location of a mobile terminal using characteristics of a signal obtained from an access point in a wireless communication system, such as a radio frequency identification (RFID), Bluetooth, a Wi-Fi positioning system, or a ultra-wideband (UWB) are being conducted for an indoor positioning system (IPS).

The indoor positioning system (IPS) may store signal information (e.g., signal strength) of a communication device (e.g., a UWB module, a Wi-Fi module, or a BLE module) installed indoors by location and may map a communication signal obtained from a user's mobile terminal and the stored signal information by location, thereby determining the location of the user.

Ultra-wideband (UWB) is a short-range wireless communication technology for transmitting and receiving data in a wide frequency band using short-time pulses. Recently, a UWB module has been used not only for short-range wireless communication but also for applications. In general, a UWB channel may be a preferred channel to be used for the IPS due to a higher precision of a communication signal than that of other communication channels. However, when a mobile terminal does not support the UWB module or the channel capacity is reduced due to a great number of users connected to the UWB channel, it may be difficult to perform an IPS using the UWB channel.

DISCLOSURE

Technical Problem

To perform user indoor position tracking, a receiver connected to a mobile terminal possessed by a user is required to periodically transmit and receive a signal. Further, depending on the type of a mobile terminal, a different communication modules may be included, and communication channel(s) may be different. Therefore, a channel suitable for a mobile terminal may be determined according to a communication environment, such as the type and location of a receiver (e.g., a BLE module, an AP, a UWB module, or a Wi-Fi module) installed indoors, a communication channel supported by the mobile terminal, and the number of users connected to a specific channel.

An electronic device according to various embodiments disclosed herein may provide a method for determining a communication channel most suitable for indoor position tracking of a mobile terminal in response to a communication environment. Specifically, the electronic device according to various embodiments disclosed herein may determine an optimal communication channel for performing an IPS, based on availability of a communication channel for the mobile terminal, the capacity of a communication channel, and/or the precision of a communication channel. The electronic device according to various embodiments disclosed herein may provide information related to the determined optimal communication channel to the mobile terminal to display the information related to the optimal communication channel for performing an IPS on the mobile terminal.

In addition, the electronic device according to various embodiments disclosed herein may determine an initial optimal communication channel and may then redetermine an optimal communication channel for performing an IPS based on reconsideration or a change in the availability of a communication channel for the mobile terminal, the capacity of a communication channel, and/or the precision of a communication channel in response to a change in communication environment. The electronic device according to various embodiments disclosed herein may provide information related to the redetermined optimal communication channel to the mobile terminal to display the information related to the changed optimal communication channel for performing an IPS on the mobile terminal.

Technical aspects to be achieved in the disclosure are not limited to the technical aspects mentioned above, and other technical aspects not mentioned will be clearly understood by those skilled in the art from the following description.

SUMMARY

An electronic device according to various embodiments disclosed herein may include a communication interface configured to be electrically connected to at least one communication device establishing a communication channel with a mobile terminal and a processor, wherein the processor may be configured to identify a plurality of communication channels for performing data exchange through a plurality of wireless communications supported by the mobile terminal, identify one of a capacity of the plurality of communication channels or a precision of the plurality of communication channels, and determine a communication channel to be used for determining a location of the mobile terminal, based on an identification result. The plurality of communication channels may include at least two channels for performing data exchange through different types of wireless communication.

A positioning system according to various embodiments disclosed herein may include a mobile terminal, at least one communication device configured to establish a communication channel with the mobile terminal, and an electronic device configured to be electrically connected to the at least one communication device through a communication interface, wherein the electronic device may be configured to identify a plurality of communication channels for performing data exchange through a plurality of wireless communications supported by the mobile terminal, identify one of a capacity of the plurality of communication channels or a precision of the plurality of communication channels, and determine a communication channel to be used for determining a location of the mobile terminal, based on an identification result. The plurality of communication channels may include at least two channels for performing data exchange through different types of wireless communication.

A method for determining an indoor position of a mobile terminal may be provided. The method may be executed by one or more processors and may include identifying a plurality of communication channels supported by the mobile terminal, wherein the plurality of communication channels comprise at least two channels performing data exchange through different types of wireless communication; identifying at least one of a respective capacity of the plurality of communication channels or a respective precision of the plurality of communication channels; and determining a communication channel to be used from the plurality of communication channels for determining the indoor position of the mobile terminal, based on an identification result. The method may further include determining the indoor position of the mobile terminal based on the determined communication channel, wherein determining the indoor position of the mobile terminal may include obtaining, from the mobile terminal, information related to a signal of the determined communication channel; and determining the indoor position of the mobile terminal based on the information related to the signal of the determined communication channel obtained from the mobile terminal and information related to a communication signal corresponding to a location.

Advantageous Effects

An electronic device according to various embodiments may determine a communication channel to be used for a system for determining the location of a mobile terminal according to a communication environment.

An electronic device according to various embodiments may determine a communication channel to be used for a system for determining the location of a mobile terminal according to availability of a communication channel for the mobile terminal.

An electronic device according to various embodiments may determine a communication channel to be used for a system for determining the location of a mobile terminal according to the capacity of a communication channel.

An electronic device according to various embodiments may determine a communication channel to be used for a system for determining the location of a mobile terminal according to the precision of a communication channel.

An electronic device according to various embodiments may provide information related to a communication channel to be used a system for determining the location of a mobile terminal to the mobile terminal.

An electronic device according to various embodiments may determine a communication channel to be used for a system for determining the location of a mobile terminal and may then redetermine a communication channel to be used for the system for determining the location of the mobile terminal in response to a change in a communication channel environment.

BRIEF DESCRIPTION OF DRAWINGS

In describing the drawings, the same or like reference numerals may be used to refer to the same or like elements.

FIG. 4 is a flowchart illustrating a method for determining an optimal communication channel for an electronic device to perform an IPS with respect to a mobile terminal according to an embodiment;

FIG. 5B illustrates an example in which an electronic device provides information related to an optimal communication channel determined for a mobile terminal according to an embodiment;

FIG. 6B illustrates an example in which an electronic device provides information related to an optimal channel redetermined for a mobile terminal in response to a change in a channel environment according to an embodiment.

DETAILED DESCRIPTION

Figure 1:
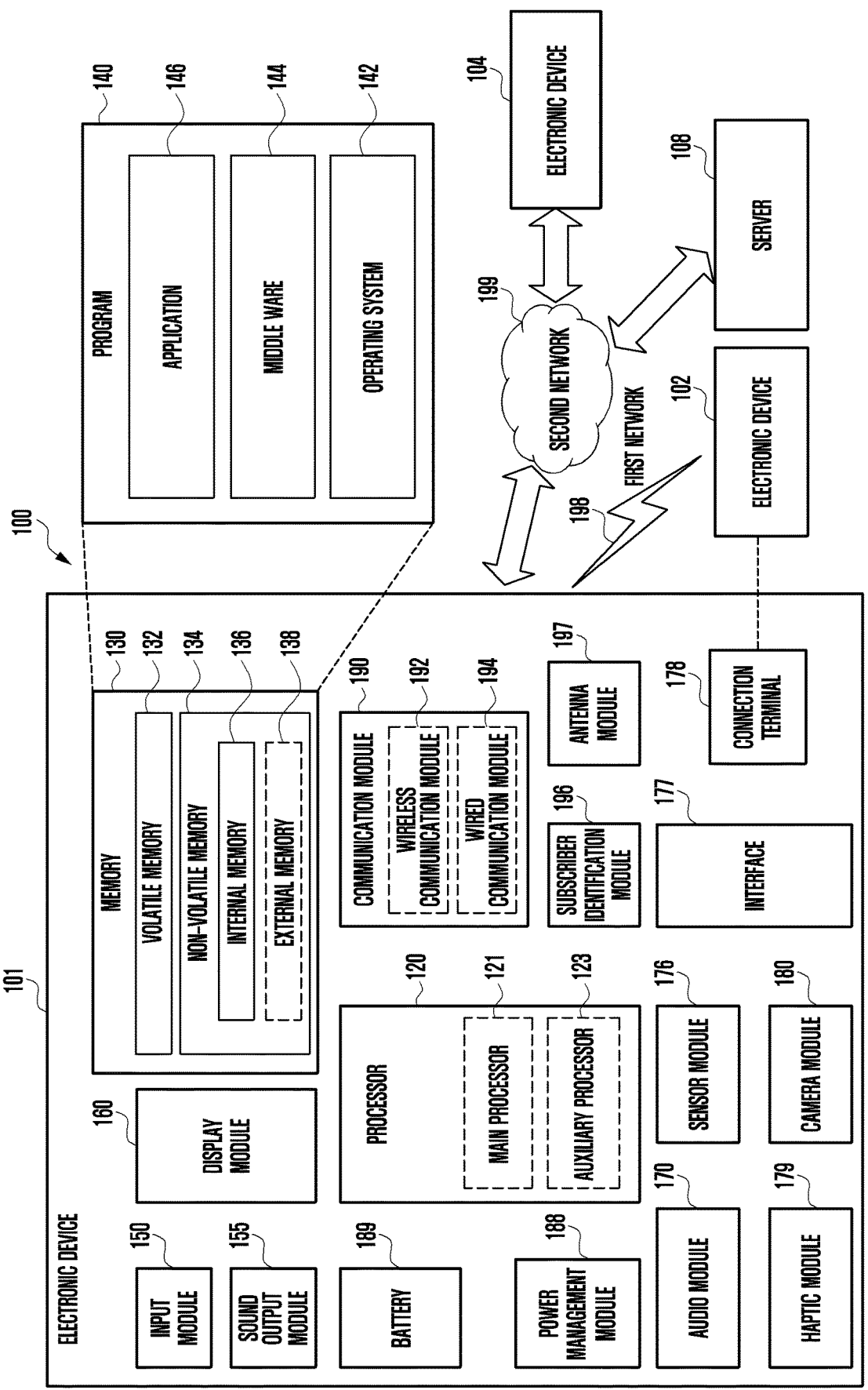
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
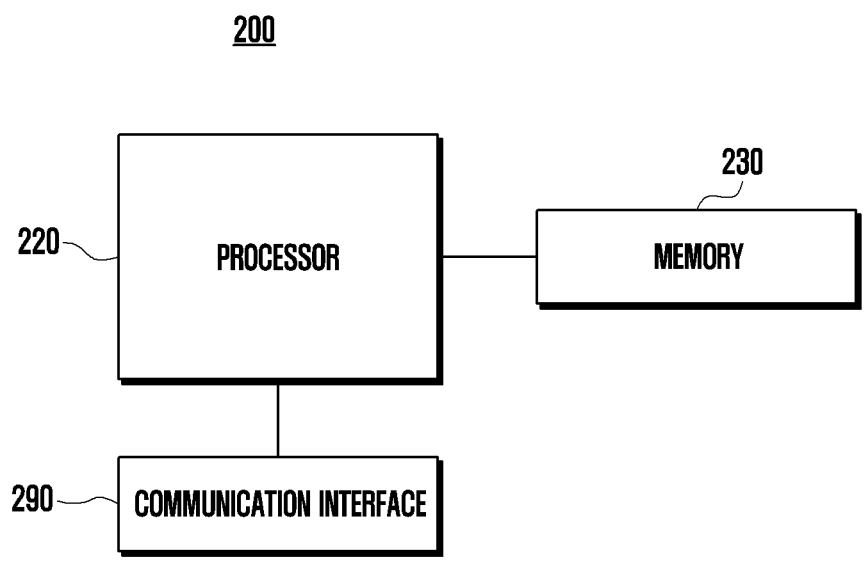
FIG. 2 is a block diagram of an electronic device according to an embodiment.

FIG. 2 is a block diagram of an electronic device according to various embodiments.

The electronic device 200 according to various embodiments may be a server module that controls a server that provides a service (e.g., an indoor positioning system (IPS)) determining the location of a mobile terminal (e.g., the mobile terminal 1000 of FIG. 3), based on information related to communication with the mobile terminal 1000.

Referring to FIG. 2, the electronic device 200 (e.g., the electronic device 101 of FIG. 1) may include a processor 220 (e.g., the processor 120 of FIG. 1), a memory 230 (e.g., the memory 130 of FIG. 1), and/or a communication interface 290. The components included in FIG. 2 are some of components included in the electronic device 200, and the electronic device 200 may include various other components as illustrated in FIG. 1.

Figure 3:
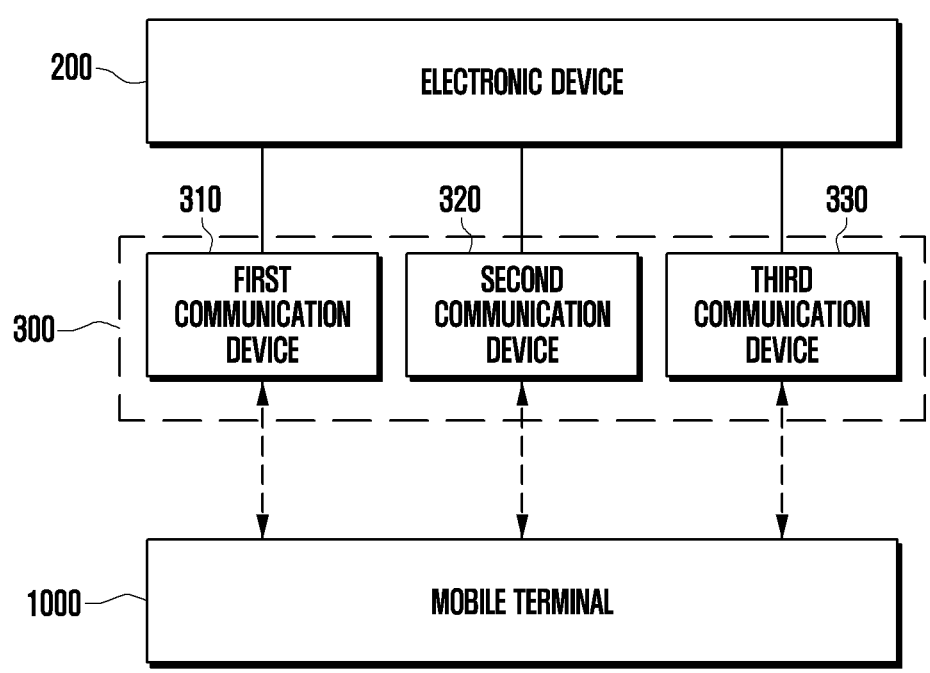
FIG. 3 illustrates a system (e.g., an indoor positioning system (IPS)) for determining the location of a mobile terminal by an electronic device being connected to a communication device to communicate with the mobile terminal according to an embodiment.

The communication interface 290 according to various embodiments may be connected to a communication device (e.g., a first communication device 310, a second communication device 320, and/or a third communication device 330 of FIG. 3). The communication interface 290 may communicate with a mobile terminal (e.g., a mobile terminal 1000 of FIG. 3) through a network (e.g., the first network 198 and/or the second network 199 of FIG. 1) using the connected communication device to receive and/or transmit various types of information. The processor 220 may be connected to the communication interface 290 to process various types of information received from the mobile terminal 1000 through the communication device. In addition, the processor 220 may be connected to the communication interface 290 to control transmission to the mobile terminal 1000 through the communication device.

The memory 230 according to various embodiments may temporarily and/or non-temporarily store information for determining the location of the mobile terminal 1000. For example, the memory 230 may store information related to signal strength of a communication channel corresponding to an arbitrary location.

The processor 220 according to various embodiments may determine an optimal communication channel for the mobile terminal 1000.

The processor 220 according to an embodiment may identify a communication channel available for the mobile terminal 1000.

The communication channel available for the mobile terminal 1000 may be a channel that can be established based on a software and/or hardware-supportable communication module (e.g., a UWB communication module, a BLE communication module, and/or a Wi-Fi communication module included in the mobile terminal 1000) included in the mobile terminal 1000 and the communication device (e.g., the first communication device 310, the second communication device 320, and/or the third communication device 330 of FIG. 3) connected to the electronic device 200.

According to an embodiment, the processor 220 may identify the available communication channel, based on the communication module included in the mobile terminal 1000 and/or the communication device 300 connected to the electronic device 200 to be installed at a location to enable communication with the mobile terminal 1000.

For example, the processor 220 may identify at least one available channel among a first channel (e.g., a UWB channel) enabling the communication module of the mobile terminal 1000 to communicate with the first communication device 310, a second channel (e.g., a BLE channel) enabling the communication module of the mobile terminal 1000 to communicate with the second communication device 320, and/or a third channel (e.g., a Wi-Fi channel) enabling the communication module of the mobile terminal 1000 to communicate with the third communication device 330.

The processor 220 according to an embodiment may identify the capacity of a communication channel.

The channel capacity of the communication channel may be a maximum speed at which information can be transmitted without occurrence of an error through the channel as a physical path used to transmit information from the communication device 300 to the mobile terminal 1000 and/or from the mobile terminal 1000 to the communication device 300.

For example, the processor 220 may identify the capacity of a communication channel of the communication device 300, based on the bandwidth of the communication channel of the communication device 300, the number of external electronic devices that can be connected to the communication channel of the communication device 300, and/or the number of external electronic devices that are connected to the communication channel of the communication device 300 and/or request a connection to the communication channel of the communication device 300.

According to an embodiment, the processor 220 may identify the channel capacity of the identified available communication channel. For example, the electronic device 200 may identify one or more communication channels having a channel capacity of a specified value or greater from among available communication channels identified in operation 410.

The processor 220 according to an embodiment may identify the precision of a communication channel. In some embodiments, the processor 220 may identify the precision of the identified channels having a channel capacity of a specified value or greater from among available communication channels.

The channel precision of the communication channel may be an indication value corresponding to the strength of a signal.

For example, the processor 220 may identify the channel precision, based on a received signal strength indicator (RSSI) of the communication channel.

According to an embodiment, the processor 220 may identify the channel precision of the communication channel having the identified channel capacity of the specified value or greater.

The processor 220 according to an embodiment may determine an optimal communication channel for performing an IPS on the mobile terminal 1000.

The optimal communication channel may be a communication channel most suitable for a system (e.g., an indoor positioning system, IPS) for identifying the location of the mobile terminal 1000 according to a specified criterion.

According to one embodiment, the processor 220 may determine an optimal communication channel, based on availability of the communication channel for the mobile terminal 1000, the channel capacity thereof, the channel precision thereof, and/or a specified criterion (e.g., a priority configured in the IPS). For example, the processor 220 may determine, as an optimal communication channel, a channel having a highest channel precision among channels having a channel capacity of the specified value or greater among communication channels available for the mobile terminal 1000.

According to an embodiment, the processor 220 may determine a channel having a highest channel precision as an optimal channel, based on the identified channel precision.

FIG. 3 illustrates a system (e.g., an indoor positioning system (IPS)) for determining the location of a mobile terminal 1000 by an electronic device (e.g., the electronic device 200 of FIG. 2) being connected to a communication device (a first communication device 310, a second communication device 320, and/or a third communication device (e.g., the electronic device 200 of FIG. 2) to communicate with the mobile terminal 1000 according to various embodiments.

The electronic device 200 according to various embodiments may be the electronic device 200 of FIG. 2.

According to an embodiment, the electronic device 200 may obtain information related to communication between the mobile terminal 1000 and the first communication device 310, the second communication device 320, and/or the third communication device 330. For example, the electronic device 200 may obtain the strength of a communication signal between the mobile terminal 1000 and the first communication device 310, the second communication device 320, and/or the third communication device 330.

The communication device 300 according to an embodiment may communicate with an external electronic device (e.g., the electronic device 102 and/or the electronic device 104 or FIG. 1) and/or a server (e.g., the server 108 of FIG. 1) through a network (e.g., the first network 198 and/or the second network 199 of FIG. 1) to receive and/or transmit various types of information. For example, the communication device 300 may communicate with the mobile terminal 1000 through a network (e.g., UWB, BT, and/or Wi-Fi) to transmit and/or receive various types of information. The electronic device 200 may be connected to the communication device 300 to process various types of information received by the communication device 300 from the mobile terminal 1000. The electronic device 200 may control the communication device 300 to transmit various types of information to the external electronic device. For example, the communication device 300 may obtain identification information (e.g., a basic service set identification (BSSID) or a network ID) about the neighboring mobile terminal 1000 and information related to a relative distance between the communication device 300 and the mobile terminal 1000 and may provide the obtained information to the electronic device 200 in response to a request for communication information about the neighboring mobile terminal 1000 of the electronic device 200. For example, the communication device 300 transmits a signal for requesting the identification information to the mobile terminal 1000, and may receive information including the identification information from the mobile terminal 1000 to obtain the identification information about the mobile terminal 1000. For example, the communication device 300 may obtain the relative distance between the communication device 300 and the mobile terminal 1000, based on the strength of a signal obtained from the mobile terminal 1000. For example, the communication device 300 may obtain the relative distance of the mobile terminal 1000, based on a characteristic of a signal (e.g., a characteristic of a difference between a transmission time and a reception time of the signal or a characteristic related to a signal level (received signal received power (RSRP) and/or received signal strength indicator (RSSI))) exchanged between the communication device 300 and the mobile terminal 1000.

The first communication device 310 according to various embodiments may include an ultra-wideband (UWB) module. The UWB module may be a short-range wireless communication module that operates through radio waves at a high frequency.

The second communication device 320 according to various embodiments may include a Bluetooth Low Energy (BLE) module. The BLE module may be a communication module capable of low-power Bluetooth communication.

The third communication device 330 according to various embodiments may include a Wi-Fi module. The Wi-Fi module may be a communication module capable of Wi-Fi communication.

The mobile terminal 1000 according to various embodiments may be the electronic device 101 of FIG. 1.

The mobile terminal 1000 according to an embodiment may include a communication module (e.g., the communication module 190 of FIG. 1). For example, the communication module of the mobile terminal 1000 may establish communication with a different device and/or an access point (AP) through at least one or a combination of two or more of an ultra-wideband (UWB) network, a Bluetooth (BT) network, a Bluetooth Low Energy (BLE) network, a Wireless Fidelity (Wi-Fi) network, an ANT+ network, a long-term evolution (LTE) network, a 5th generation (5G) network, and a narrowband Internet of things (NB-IoT) network. For example, the mobile terminal 1000 may include a UWB module capable of communicating with the first communication device 310, a BLE module capable of communicating with the second communication device 320, and/or a Wi-Fi module capable of communicating with the third communication device 330.

FIG. 4 is a flowchart illustrating a method for determining an optimal communication channel for an electronic device (e.g., the electronic device 200 of FIG. 2) to perform an IPS with respect to a mobile terminal (e.g., the mobile terminal 1000 of FIG. 3) according to various embodiments.

In operation 410, the electronic device 200 according to various embodiments may identify a communication channel available for the mobile terminal 1000.

The communication channel available for the mobile terminal 1000 may be a channel that can be established based on a software and/or hardware-supportable communication module (e.g., a UWB communication module, a BLE communication module, and/or a Wi-Fi communication module included in the mobile terminal 1000) included in the mobile terminal 1000 and a communication device (e.g., the first communication device 310, the second communication device 320, and/or the third communication device 330 of FIG. 3) connected to the electronic device 200.

According to an embodiment, the electronic device 200 may identify the available communication channel, based on the communication module included in the mobile terminal 1000 and/or the communication device 300 connected to the electronic device 200 to be installed at a location to enable communication with the mobile terminal 1000.

For example, the electronic device 200 may identify at least one available channel among a first channel (e.g., a UWB channel) enabling the communication module of the mobile terminal 1000 to communicate with the first communication device 310, a second channel (e.g., a BLE channel) enabling the communication module of the mobile terminal 1000 to communicate with the second communication device 320, and/or a third channel (e.g., a Wi-Fi channel) enabling the communication module of the mobile terminal 1000 to communicate with the third communication device 330.

In operation 420, the electronic device 200 according to various embodiments may identify the capacity of the communication channel.

The channel capacity of the communication channel may be a maximum speed at which information can be transmitted without occurrence of an error through the channel as a physical path used to transmit information from the communication device 300 to the mobile terminal 1000 and/or from the mobile terminal 1000 to the communication device 300.

For example, the electronic device 200 may identify the capacity of a communication channel of the communication device 300, based on the bandwidth of the communication channel of the communication device 300, the number of external electronic devices that can be connected to the communication channel of the communication device 300, and/or the number of external electronic devices that are connected to the communication channel of the communication device 300 and/or request a connection to the communication channel of the communication device 300.

According to an embodiment, the electronic device 200 may identify the channel capacity of the available communication channel identified in operation 410. For example, the electronic device 200 may identify a communication channel having a channel capacity of a specified value or greater from among available communication channels identified in operation 410.

In operation 430, the electronic device 200 according to various embodiments may identify the precision of the communication channel.

The channel precision of the communication channel may be an indication value corresponding to the strength of a signal.

For example, the electronic device 200 may identify the channel precision, based on a received signal strength indicator (RSSI) of the communication channel.

According to an embodiment, the electronic device 200 may identify the channel precision of the communication channel having the channel capacity of the specified value or greater identified in operation 420.

In operation 440, the electronic device 200 according to various embodiments may determine an optimal communication channel for performing an IPS on the mobile terminal 1000.

The optimal communication channel may be a communication channel most suitable for a system (e.g., an indoor positioning system, IPS) for identifying the location of the mobile terminal 1000 according to a specified criterion.

According to one embodiment, the electronic device 200 may determine an optimal communication channel, based on availability of the communication channel for the mobile terminal 1000, the channel capacity thereof, the channel precision thereof, and/or a specified criterion (e.g., a priority configured in the IPS). For example, the electronic device 200 may determine, as an optimal communication channel, a channel having a highest channel precision among channels having a channel capacity of the specified value or greater among communication channels available for the mobile terminal 1000.

According to an embodiment, the electronic device 200 may determine a channel having a highest channel precision as an optimal channel, based on the channel precision identified in operation 430.

Figure 5A:
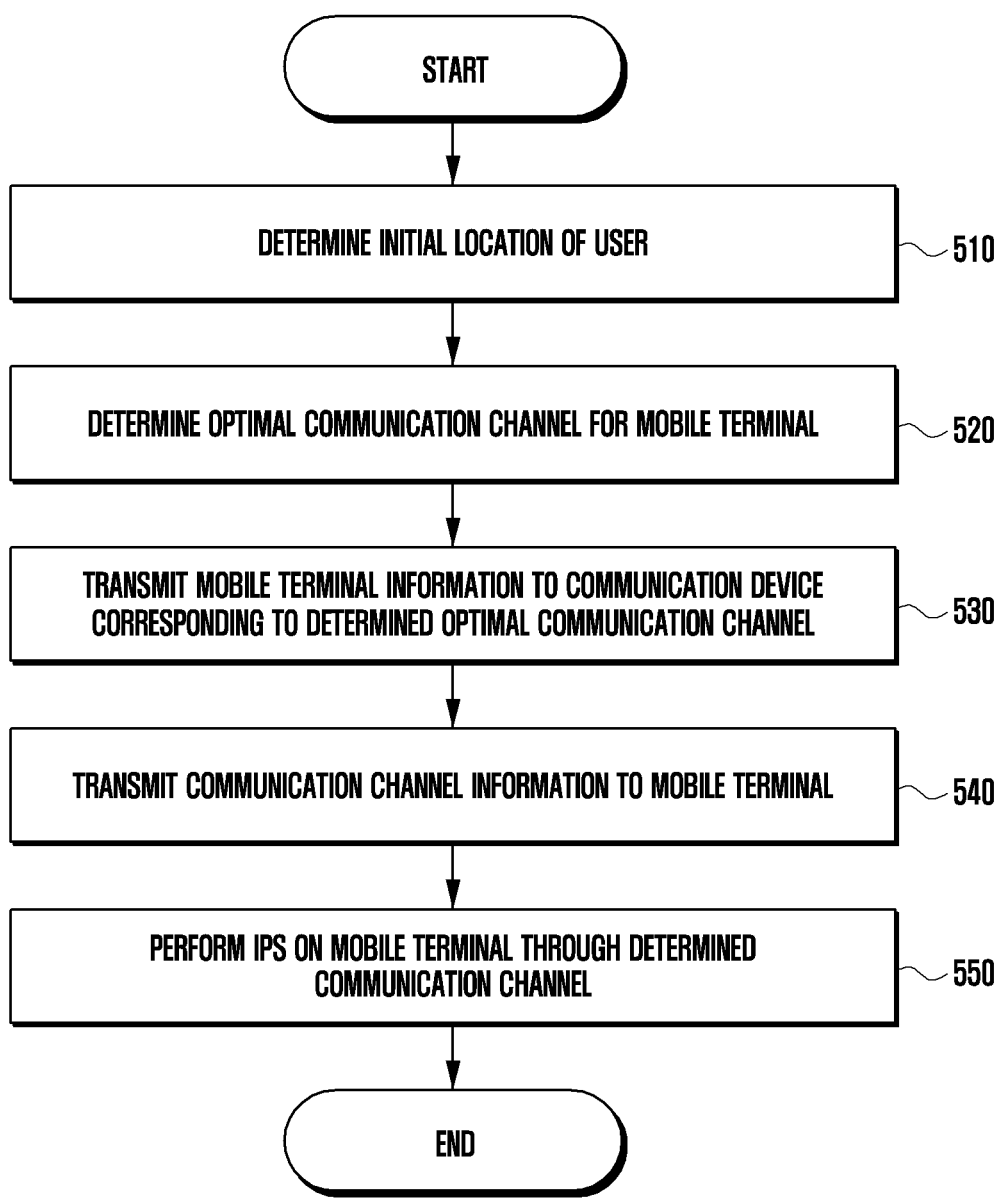
FIG. 5A is a flowchart illustrating a method for an electronic device to perform an indoor positioning system (IPS) through an optimal communication channel determined for a mobile terminal according to an embodiment.

FIG. 5A is a flowchart illustrating a method for an electronic device (e.g., the electronic device 200 of FIG. 2) to perform an indoor positioning system (IPS) through an optimal communication channel determined for a mobile terminal (e.g., the mobile terminal 1000 of FIG. 3) according to various embodiments.

In operation 510, the electronic device 200 according to various embodiments may determine the initial location of the mobile terminal 1000.

According to an embodiment, the electronic device 200 may obtain the initial location of the mobile terminal 1000 from the mobile terminal 1000. For example, the mobile terminal 1000 may identify the initial location, based on an input from a user.

According to an embodiment, the electronic device 200 may obtain the initial location of the mobile terminal 1000 from a camera image. For example, the electronic device 200 may recognize the user of the mobile terminal 1000 included in the camera image, and may identify the initial location of the mobile terminal 1000, based on the recognized user.

According to an embodiment, the electronic device 200 may obtain information related to a communication channel through which the mobile terminal 1000 is capable of communication from the mobile terminal 1000.

In operation 520, the electronic device 200 according to various embodiments may determine an optimal communication channel for performing an IPS with respect to the mobile terminal 1000.

The electronic device 200 according to an embodiment may determine the optimal channel for the mobile terminal 1000 from among channels available at the initial location of the mobile terminal 1000. For example, the electronic device 200 may identify a communication device 300 capable of communicating with the mobile terminal 1000 at the initial location of the mobile terminal 1000. For example, the electronic device 200 may identify the communication device 300 capable of communicating with the mobile terminal 1000 among communication devices 300 installed to be located in an area photographed by a camera that recognizes the user of the mobile terminal 1000.

The electronic device 200 according to an embodiment may determine the optimal communication channel for performing an IPS with respect to the mobile terminal 1000 by performing operation 410 to operation 440 of FIG. 4.

In operation 530, the electronic device 200 according to various embodiments may transmit information related to the mobile terminal 1000 to a communication device (e.g., a first communication device 310, a second communication device 320, and/or a third communication device 330) corresponding to the determined optimal communication channel.

According to an embodiment, the electronic device 200 may transmit information related to identification information about the mobile terminal 1000 to the communication device (e.g., the first communication device 310, the second communication device 320, and/or the third communication device 330) corresponding to the determined optimal communication channel.

According to an embodiment, the electronic device 200 may control the communication device (e.g., the first communication device 310, the second communication device 320, and/or the third communication device 330) corresponding to the optimal communication channel determined to obtain information for determining the location of the mobile terminal 1000. For example, the electronic device 200 may control the communication device (e.g., the first communication device 310, the second communication device 320, and/or the third communication device 330) corresponding to the determined optimal communication channel so that the communication device (e.g., the first communication device 310, the second communication device 320, and/or the third communication device 330) may communicate with the mobile terminal 1000 to obtain the strength (e.g., RSSI) of a communication signal.

In operation 540, the electronic device 200 according to various embodiments may transmit information related to the determined optimal communication channel to the mobile terminal 1000.

The electronic device 200 according to an embodiment may transmit information related to an optimal communication channel connected to the mobile terminal 1000 to the mobile terminal 1000. For example, the electronic device 200 may transmit information related to a channel through which an IPS is performed to the mobile terminal 1000. For example, the electronic device 200 may transmit the information related to the optimal communication channel connected to the mobile terminal 1000 so that the information related to the channel through which the IPS is performed is provided for the mobile terminal 1000 in an icon and/or text format on a top notification bar, a sub-menu, and/or a device menu. For example, in response to the determined optimal communication channel and the connected communication channel being a first channel (e.g., UWB channel), the electronic device 200 may transmit the information related to the channel through which the IPS is performed to the mobile terminal 1000 so that the mobile terminal 1000 displays information indicating that the channel through the IPS is performed is the first channel. For example, the electronic device 200 may transmit the information related to the optimal communication channel connected to the mobile terminal 1000 so that the mobile terminal 1000 provides the information related to the channel through the IPS is performed as shown in FIG. 5B.

In response to a communication channel selected for performing an IPS in the mobile terminal 1000 being different from the determined optimal communication channel, the electronic device 200 according to an embodiment may transmit information for requesting selection of the determined optimal communication channel to the mobile terminal 1000. For example, in response to the determined optimal communication being a second channel (e.g., a BLE channel) and the communication channel selected for performing the IPS in the mobile terminal 1000 being the first channel (e.g., the UWB channel), the electronic device 200 may transmit information for requesting the mobile terminal 1000 to select the second channel (e.g., the BLE channel) to the mobile terminal 1000.

In response to the determined optimal communication channel being unavailable, the electronic device 200 according to an embodiment may transmit information related to an IPS being unavailable to the mobile terminal 1000. For example, the electronic device 200 may transmit, to the mobile terminal 1000, information enabling the mobile terminal 1000 to display information indicating that an IPS is unavailable for the mobile terminal 1000 as shown in part (a) of FIG. 5C.

In response to a communication module of the mobile terminal 1000 corresponding to the determined optimal communication channel being inactive, the electronic device 200 according to an embodiment may transmit information for requesting activation of the communication module to the mobile terminal 1000. For example, in response to the determined optimal communication channel being the second channel (e.g., the BLE channel) and the communication module (e.g., a BLE communication module) of the mobile terminal 1000 corresponding to the second channel being inactive, the electronic device 200 may transmit information for requesting the mobile terminal 1000 to activate the communication module (e.g., the BLE communication module) corresponding to the second channel to the mobile terminal 1000. For example, the electronic device 200 may transmit, to the mobile terminal 1000, information for requesting activation of the communication module corresponding to the determined optimal communication channel in an icon and/or text format on the top notification menu, the sub-menu, and/or a pop-up menu. For example, the electronic device 200 may transmit the information for requesting the mobile terminal 1000 to activate the communication module corresponding to the optimal communication channel determined for the mobile terminal 1000 as shown in part (b) and part (c) of FIG. 5C.

In operation 550, the electronic device 200 according to various embodiments may perform an indoor positioning system (IPS) on the mobile terminal 1000 through the determined channel.

According to an embodiment, the electronic device 200 may determine the location of the mobile terminal 1000, based on the strength of a communication signal between the mobile terminal 1000 and the communication device (e.g., the first communication device 310, the second communication device 320, and/or the third communication device 330) corresponding to the determined communication channel.

For example, the electronic device 200 may obtain the strength (e.g., RSSI) of a signal in the determined communication channel from the mobile device 1000.

For example, the electronic device 200 may store signal strength information (e.g., fingerprinting according to an RSSI by each communication module) of a communication channel corresponding to an arbitrary location. For example, the signal strength information of the communication channel corresponding to the arbitrary location may be in the form of a map in which a designated area is mapped according to the strength of a signal. The electronic device 200 may determine the location of the mobile terminal 1000, based on the stored information and the signal strength of a communication channel obtained from the mobile device 1000.

According to an embodiment, the electronic device 200 may obtain the location of the mobile terminal 1000 in real time by processing information related to a communication channel connected to the mobile terminal 1000 in real time.

FIG. 5B illustrates an example in which an electronic device (e.g., the electronic device 200 of FIG. 2) provides information related to an optimal communication channel determined for a mobile terminal (e.g., the mobile terminal 1000 of FIG. 3) according to various embodiments.

The electronic device 200 according to an embodiment may transmit information related to an optimal communication channel connected to the mobile terminal 1000 to the mobile terminal 1000. For example, the electronic device 200 may transmit information related to a channel through which an IPS is performed to the mobile terminal 1000.

The mobile terminal 1000 according to an embodiment may display the information related to the channel through which the IPS is performed in an icon and/or text format on a top notification bar, a sub-menu, and/or a device menu, based on the information related to the communication channel obtained from the electronic device 200. For example, in response to a determined optimal communication channel and the connected communication channel being a first channel (e.g., UWB channel), the mobile terminal 1000 may display information indicating that the channel through which the IPS is performed is the first channel.

Referring to part (a), the mobile terminal 1000 may provide the information related to the communication channel obtained from the electronic device 200 through an IPS-related icon. For example, when a user selects the IPS-related icon on a screen displaying the sub-menu as shown in part (a), the mobile terminal 1000 may provide the information related to the optimal communication channel connected to the mobile terminal 1000 to the user.

Referring to part (b), the mobile terminal 1000 may provide the information related to the communication channel obtained from the electronic device 200 through the top notification bar. For example, in an example of part (b), the mobile terminal 1000 may display that the channel through which the IPS is performed is the UWB channel through the top notification bar.

Figure 5C:
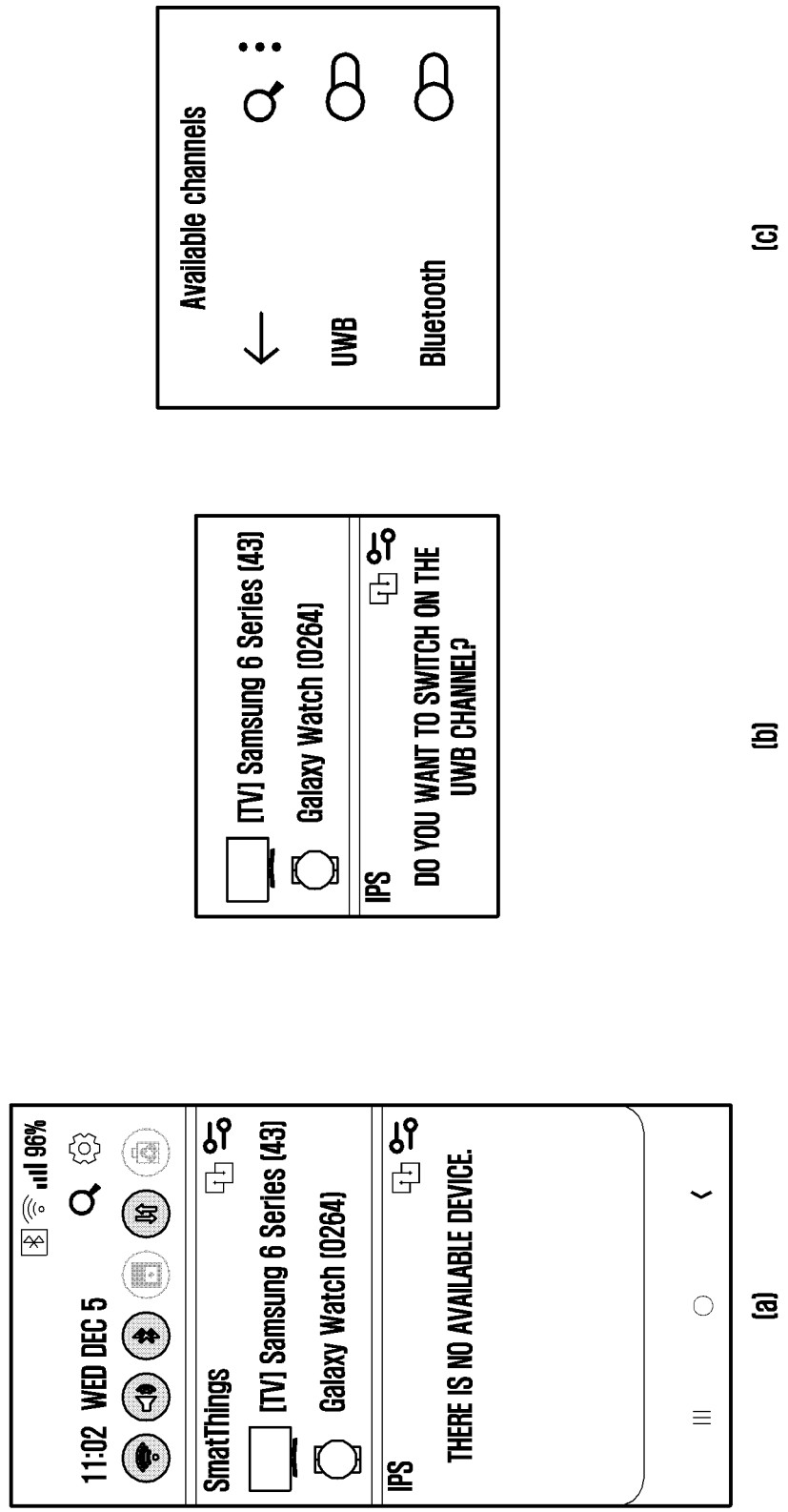
FIG. 5C illustrates an example in which an electronic device provides information related to an optimal channel determined for a mobile terminal according to an embodiment.

FIG. 5C illustrates an example in which an electronic device (e.g., the electronic device 200 of FIG. 2) provides information related to an optimal channel determined for a mobile terminal (e.g., the mobile terminal 1000 of FIG. 3) according to various embodiments.

The mobile terminal 1000 according to an embodiment may display information related to an IPS being unavailable in response to a determined optimal communication channel being unavailable, based on information related to a communication channel obtained from the electronic device 200.

Referring to part (a), the mobile terminal 1000 may display information indicating that an IPS is unavailable (e.g., "There is no available device.") on a top notification bar, based on the information related to the communication channel obtained from the electronic device 200.

Referring to part (c), in response to selection of information indicating that an IPS is unavailable (e.g., part (a)) on the top notification bar, the mobile terminal 1000 may display an icon for activating an IPS-related communication module.

The mobile terminal 1000 according to an embodiment may display information for requesting activation of a communication module corresponding to the determined optimal communication channel in response to the communication module being inactive, based on the information related to the communication channel obtained from the electronic device 200. For example, in response to the determined optimal communication channel being a second channel (e.g., a BLE channel) and a communication module (e.g., a BLE communication module) corresponding to the second channel being inactive, the mobile terminal 1000 may display information for requesting activation of the communication module (e.g., the BLE communication module) corresponding to the second channel. For example, the electronic device 200 may transmit information for requesting the mobile terminal 1000 to activate the communication module corresponding to the determined optimal communication channel in an icon and/or text format on the top notification menu, a sub-menu, and/or a pop-up menu.

Referring to drawing (b), in response to the determined optimal communication channel being a UWB channel and a UWB module being inactive, the mobile terminal 1000 may display information (e.g., "Do you want to switch on the channel?") for requesting activation of the UWB module.

Referring to drawing (c), in response to a user selecting a request to activate the UWB module (e.g., drawing (b)), the mobile terminal 1000 may display an icon for activating the UWB module.

Figure 6A:
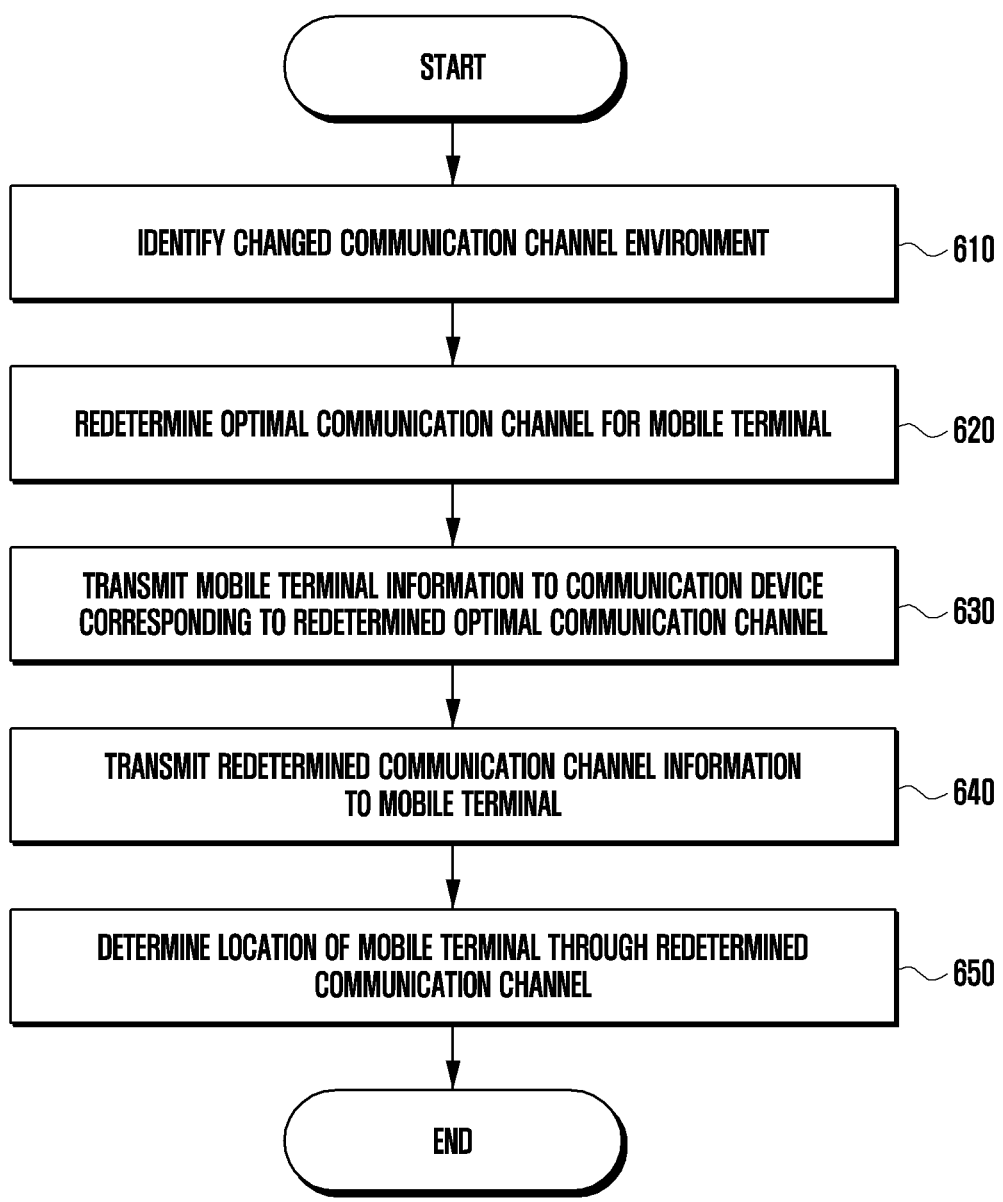
FIG. 6A is a flowchart illustrating a method for an electronic device to perform an indoor positioning system (IPS) through an optimal communication channel redetermined for a mobile terminal in response to a change in a channel environment according to an embodiment.

FIG. 6A is a flowchart illustrating a method for an electronic device (e.g., the electronic device 200 of FIG. 2) to perform an indoor positioning system (IPS) through an optimal communication channel redetermined for a mobile terminal (e.g., the mobile terminal 1000 of FIG. 3) in response to a change in a channel environment according to various embodiments.

In operation 610, the electronic device 200 according to various embodiments may identify a changed channel environment.

According to an embodiment, the electronic device 200 may identify a channel environment that is changed according to a change in the location of the mobile terminal 1000.

For example, the electronic device 200 may identify a changed channel environment in response to a communication device 300 installed around the changed location of the mobile terminal 1000. For example, the electronic device 200 may identify a changed channel environment in response to a communication channel available for the mobile terminal 1000 in response to the changed location of the mobile terminal 1000. For example, the electronic device 200 may identify a changed channel environment in response to the channel capacity of the communication channel according to the number of external electronic devices connected to the communication channel at the changed location of the mobile terminal 1000. For example, the electronic device 200 may identify a changed channel environment in response to the changed strength of a communication signal in response to an environment (e.g., an obstacle or a congestion level) of the changed location of the mobile terminal 1000.

In operation 620, the electronic device 200 according to various embodiments may redetermine an optimal channel for the mobile terminal 1000.

The electronic device 200 according to an embodiment may redetermine an optimal communication channel for performing an IPS with respect to the mobile terminal 1000 by performing operation 410 to operation 440 of FIG. 4.

For example, the electronic device 200 may determine a second channel (e.g., a BLE channel) as an initial optimal communication channel in response to the channel capacity of a first channel (e.g., a UWB channel) being a specified value or less due to the number of external electronic devices connected to the first channel being a specified number or greater at the time of determining the initial optimal communication channel for the mobile terminal 1000. Subsequently, the electronic device 200 may redetermine the first channel as an optimal communication channel in response to a change in the channel environment to the channel capacity of the first channel of the specified value or greater due to a change in the number of external electronic devices connected to the first channel (e.g., the UWB channel) to less than the specified number.

For example, the electronic device 200 may determine the first channel (e.g., the UWB channel) as the initial optimal communication channel for the mobile terminal 1000. Subsequently, when the distance between the mobile terminal 1000 and the communication device 310 is out of a communication range due to a change in the location of the terminal 1000 and thus the channel environment is change such that the first channel is unavailable, the electronic device 200 may redetermine the second channel (e.g., the BLE channel) and/or a third channel (e.g., a Wi-Fi channel) as an optimal communication channel.

In operation 630, the electronic device 200 according to various embodiments may transmit information related to the mobile terminal 1000 to a communication device (e.g., the first communication device 310, the second communication device 320, and/or the third communication device 330) corresponding to the redetermined optimal communication channel.

According to an embodiment, the electronic device 200 may transmit information related to identification information about the mobile terminal 1000 to the communication device (e.g., the first communication device 310, the second communication device 320, and/or the third communication device 330) corresponding to the redetermined optimal communication channel.

According to an embodiment, the electronic device 200 may control the communication device (e.g., the first communication device 310, the second communication device 320, and/or the third communication device 330) corresponding to the redetermined optimal communication channel to obtain information for determining the location of the mobile terminal 1000. For example, the electronic device 200 may control the communication device (e.g., the first communication device 310, the second communication device 320, and/or the third communication device 330) corresponding to the redetermined optimal communication channel so that the communication device (e.g., the first communication device 310, the second communication device 320, and/or the third communication device 330) communicates with the mobile terminal 1000 to obtain the strength (e.g., RSSI) of a communication signal.

In operation 640, the electronic device 200 according to various embodiments may transmit information about the redetermined channel to the mobile terminal 1000.

The electronic device 200 according to an embodiment may transmit changed channel information to the mobile terminal 1000 in response to the optimal communication channel being redetermined and changed. For example, the electronic device 200 may transmit information for the mobile terminal 1000 to display the changed channel information to the mobile terminal 1000 as shown in part (a) of FIG. 6B.

In response to a communication module of the mobile terminal 1000 corresponding to the redetermined optimal communication channel being inactive, the electronic device 200 according to an embodiment may transmit information for requesting activation of the communication module to the mobile terminal 1000. For example, in response to the determined optimal communication channel being the second channel (e.g., the BLE channel) and a communication module (e.g., a BLE communication module) of the mobile terminal 1000 corresponding to the second channel being inactive, the electronic device 200 may transmit information for requesting the mobile terminal 1000 to activate the communication module (e.g., the BLE communication module) corresponding to the second channel to the mobile terminal 1000. For example, the electronic device 200 may transmit the information for requesting the mobile terminal 1000 to activate the communication module corresponding to the determined optimal communication channel in an icon and/or text format on a top notification bar, a sub-menu, and/or a pop-up menu. For example, the electronic device 200 may transmit the information for requesting the mobile terminal 1000 to activate the communication module corresponding to the determined optimal communication channel to the mobile terminal 1000 as shown in part (b) of FIG. 6B.

In operation 650, the electronic device 200 according to various embodiments may perform an IPS on the mobile terminal 1000 through the redetermined channel.

According to an embodiment, the electronic device 200 may determine the location of the mobile terminal 1000, based on the strength of the communication signal between the mobile terminal 1000 and the communication device (e.g., the first communication device 310, the second communication device 320, and/or the third communication device 330) corresponding to the redetermined communication channel For example, the electronic device 200 may obtain the signal strength (e.g., RSSI) of the communication channel from the communication device (e.g., the first communication device 310, the second communication device 320, and/or the third communication device 330).

For example, the electronic device 200 may store signal strength information (e.g., fingerprinting according to an RSSI by each communication device) of a communication channel corresponding to an arbitrary location. For example, the signal strength information of the communication channel corresponding to the arbitrary location may be in the form of a map in which a designated area is mapped according to the strength of a signal. The electronic device 200 may determine the location of the mobile terminal 1000, based on the stored information and the obtained signal strength of the communication channel.

According to an embodiment, the electronic device 200 may obtain the location of the mobile terminal 1000 in real time by processing information related to a communication channel connected to the mobile terminal 1000 in real time.

FIG. 6B illustrates an example in which an electronic device (e.g., the electronic device 200 of FIG. 2) provides information related to an optimal channel redetermined for a mobile terminal (e.g., the mobile terminal 1000 of FIG. 3) in response to a change in a channel environment according to various embodiments.

The mobile terminal 1000 according to an embodiment may obtain changed channel information from the electronic device 200 in response to an optimal communication channel being redetermined and changed. For example, the mobile terminal 1000 may display the changed channel information.

Referring to part (a), the mobile terminal 1000 may provide the information related to the redetermined communication channel obtained from the electronic device 200 through an IPS-related icon and/or text (e.g., an IPS icon and a redetermined optimal communication channel "UWB").

The mobile terminal 1000 according to an embodiment may display information for requesting activation of a communication module of the mobile terminal 1000 corresponding to the redetermined optimal communication channel in response to the communication module being inactive. For example, in response to the redetermined optimal communication channel being a second channel (e.g., a BLE channel) and a communication module (e.g., a BLE communication module) of the mobile terminal corresponding to the second channel being inactive, the mobile terminal 1000 may display information for requesting the mobile terminal 1000 to activate the communication module (e.g., the BLE communication module) corresponding to the second channel. For example, the mobile terminal 1000 may display the information for requesting activation of the communication module corresponding to the determined optimal communication channel in an icon and/or text format on a top notification bar, a sub-menu, and/or a pop-up menu.

Referring to part (b), the mobile terminal 1000 may display an icon for activating the communication module corresponding to the redetermined optimal communication channel related to an IPS.

An electronic device according to various embodiments may include a communication interface configured to be electrically connected to at least one communication device establishing a communication channel with a mobile terminal and a processor, wherein the processor may identify a plurality of communication channels for performing data exchange e.g., data transmission and/or data reception through a plurality of wireless communications supported by the mobile terminal, may identify a capacity and/or precision of the communication channels, and may determine a communication channel to be used for determining a location of the mobile terminal, based on an identification result, and the plurality of communication channels may include at least two channels for performing data exchange through different types of wireless communication.

In the electronic device according to various embodiments, the processor may identify the communication channel available for the mobile terminal, based on a communication module included in the mobile terminal and the communication device installed at a location to enable connection with the mobile terminal.

In the electronic device according to various embodiments, the processor may identify the capacity of the communication channels, based on a bandwidth of the communication channels and a number of external electronic devices connected to the communication channels.

In the electronic device according to various embodiments, the processor may identify the precision of the communication channels, based on a strength of a signal of the communication channels.

In the electronic device according to various embodiments, the processor may identify a channel having the capacity of the communication channels being a specified value or greater among the communication channels available for the mobile terminal, and may determine a channel having a highest precision of the communication channels among the channel having the capacity of the communication channels being the specified value or greater as the communication channel to be used for determining the location of the mobile terminal.

In the electronic device according to various embodiments, the processor may transmit information related to the mobile terminal to the communication device corresponding to the determined communication channel, may transmit information related to the determined communication channel to the mobile terminal, and may determine the location of the mobile terminal through the determined communication channel.

The electronic device according to various embodiments may further include a memory configured to store information related to a communication signal corresponding to a location, wherein the processor may obtain information related to a signal of the determined communication channel from the mobile terminal, and may determine the location of the mobile terminal, based on the information related to the communication signal corresponding to the location stored in the memory and the information related to the signal of the determined communication channel obtained from the mobile terminal.

In the electronic device according to various embodiments, the processor may redetermine a communication channel to be used for determining the location of the mobile terminal in response to a change in a communication channel environment, may transmit information related to the mobile terminal to the communication device corresponding to the redetermined communication channel, may transmit information related to the redetermined communication channel to the mobile terminal, and may determine the location of the mobile terminal through the redetermined communication channel.

A positioning system according to various embodiments may include a mobile terminal, at least one communication device configured to establish a communication channel with the mobile terminal, and an electronic device configured to be electrically connected to the at least one communication device through a communication interface, wherein the electronic device may identify a plurality of communication channels for performing data exchange, e.g., data transmission and/or data reception through a plurality of wireless communications supported by the mobile terminal, may identify a capacity and/or precision of the communication channels, and may determine a communication channel to be used for determining a location of the mobile terminal, based on an identification result, and the plurality of communication channels may include at least two channels for performing data exchange reception through different types of wireless communication.

In the positioning system according to various embodiments, the electronic device may identify the communication channel available for the mobile terminal, based on a communication module included in the mobile terminal and the communication device installed at a location to enable connection with the mobile terminal.

In the positioning system according to various embodiments, the electronic device may identify the capacity of the communication channels, based on a bandwidth of the communication channels and a number of external electronic devices connected to the communication channels.

In the positioning system according to various embodiments, the electronic device may identify the precision of the communication channels, based on a strength of a signal of the communication channels.

In the positioning system according to various embodiments, the electronic device may identify one or more channels having the capacity of the communication channels being a specified value or greater among the communication channels available for the mobile terminal, and may determine a channel having a highest precision of the communication channels among the one or more channels having the capacity of the communication channels being the specified value or greater as the communication channel to be used for determining the location of the mobile terminal.

In the positioning system according to various embodiments, the at least one communication device may include a first communication device configured to include a UWB module, a second communication device configured to include a BLE module, and a third communication device configured to include a Wi-Fi module, and the communication channels may include a first communication channel established by the first communication device, a second communication channel established by the second communication device, and a third communication channel established by the second communication device.

In the positioning system according to various embodiments, the electronic device may transmit information related to the mobile terminal to the communication device corresponding to the determined communication channel, may transmit information related to the determined communication channel to the mobile terminal, and may determine the location of the mobile terminal through the determined communication channel.

In the positioning system according to various embodiments, the electronic device may store information related to a communication signal corresponding to a location, may obtain information related to a signal of the determined communication channel from the mobile terminal, and may determine the location of the mobile terminal, based on the stored information related to the communication signal corresponding to the location and the information related to the signal of the determined communication channel obtained from the mobile terminal.

In the positioning system according to various embodiments, the mobile terminal may display the information related to the determined communication channel, based on the information related to the determined communication channel obtained from the electronic device.

In the positioning system according to various embodiments, the mobile terminal may display information for requesting selection of the determined optimal communication channel in response to the determined communication channel being different from a communication channel selected by the mobile terminal for the positioning system.

In the positioning system according to various embodiments, the mobile terminal may display information for requesting activation of a communication module corresponding to the determined communication channel in response to the communication module being inactive.

In the positioning system according to various embodiments, the electronic device may redetermine a communication channel to be used for determining the location of the mobile terminal in response to a change in a communication channel environment, may transmit information related to the mobile terminal to the communication device corresponding to the redetermined communication channel, may transmit information related to the redetermined communication channel to the mobile terminal, and may determine the location of the mobile terminal through the redetermined communication channel.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a communication interface configured to be connected to at least one communication device establishing a communication channel with a mobile terminal;
    memory, including one or more storage media, storing instructions; and
    at least one processor including processing circuitry;
    wherein the instructions, when executed by the at least one processor individually or collectively, cause the electronic device to:
        identify a plurality of communication channels for performing data exchange through a plurality of wireless communications supported by the mobile terminal,
        identify one of a capacity of the plurality of communication channels or a precision of the plurality of communication channels, and
        determine a communication channel to be used for determining a location of the mobile terminal, based on an identification result,
        determine another communication channel to be used for determining the location of the mobile terminal in response to one of:
            a change in the number of external electronic devices connected to the determined communication channel when the identification result is based on the capacity of the plurality of communication channels, or
            a change in a strength of signal of the determined communication channel when the identification result is based on the precision of the plurality of communication channels, and
    wherein the plurality of communication channels comprises at least two channels for performing data exchange through different types of wireless communication.

2. The electronic device of claim 1, wherein the instructions, when executed by the at least one processor individually or collectively, cause the electronic device to identify a communication channel available for the mobile terminal, based on a communication module comprised in the mobile terminal and a communication device installed at a location to enable connection with the mobile terminal.

3. The electronic device of claim 1, wherein the instructions, when executed by the at least one processor individually or collectively, cause the electronic device is further configured to identify the capacity of the plurality of communication channels based on a bandwidth of the plurality of communication channels and the number of external electronic devices connected to respective communication channels from the plurality of communication channels.

4. The electronic device of claim 1, wherein the instructions, when executed by the at least one processor individually or collectively, cause the electronic device to identify the precision of the plurality of communication channels based on a strength of a signal of respective communication channels of the plurality of communication channels.

5. The electronic device of claim 1, wherein the instructions, when executed by the at least one processor individually or collectively, cause the electronic device to:
    identify one or more channels from the plurality of communication channels having a respective capacity of a specified value or greater from the plurality of communication channels supported by the mobile terminal, and
    determine a channel from the one or more channels having a highest precision as the communication channel to be used for determining the location of the mobile terminal.

6. The electronic device of claim 1, wherein the instructions, when executed by the at least one processor individually or collectively, cause the electronic device to:
    transmit information related to the mobile terminal to a communication device corresponding to the determined communication channel,
    transmit information related to the determined communication channel to the mobile terminal, and
    determine the location of the mobile terminal through the determined communication channel.

7. The electronic device of claim 6,
    where in the memory configured to store information related to a communication signal corresponding to a location; and
    wherein the instructions, when executed by the at least one processor individually or collectively, cause the electronic device:
        obtain information related to a signal of the determined communication channel from the mobile terminal, and
        determine the location of the mobile terminal, based on the information related to the communication signal corresponding to the location stored in the memory and the information related to the signal of the determined communication channel obtained from the mobile terminal.

8. The electronic device of claim 1, wherein the instructions, when executed by the at least one processor individually or collectively, cause the electronic device to:
    transmit information related to the mobile terminal to a communication device corresponding to the another communication channel,
    transmit information related to the another communication channel to the mobile terminal, and
    determine the location of the mobile terminal through the another communication channel.

9. A positioning system comprising:
    a mobile terminal;
    at least one communication device configured to establish a communication channel with the mobile terminal; and an electronic device configured to be electrically connected to the at least one communication device through a communication interface,
wherein the electronic device is configured to:
identify a plurality of communication channels for performing data exchange through a plurality of wireless communications supported by the mobile terminal,
identify one of a capacity of the plurality of communication channels or a precision of the plurality of communication channels, and
determine a communication channel to be used for determining a location of the mobile terminal, based on an identification result,
determine another communication channel to be used for determining the location of the mobile terminal in response to one of:
a change in the number of external electronic devices connected to the determined communication channel when the identification result is based on the capacity of the plurality of communication channels, or
a change in a strength of signal of the determined communication channel when the identification result is based on the precision of the plurality of communication channels, and
wherein the plurality of communication channels comprise at least two channels for performing data exchange through different types of wireless communication.

10. The positioning system of claim 9, wherein the electronic device is further configured to identify a communication channel available for the mobile terminal, based on a communication module comprised in the mobile terminal and the at least one communication device, wherein the at least one communication device is installed at a location to enable connection with the mobile terminal.

11. The positioning system of claim 9, wherein the electronic device is further configured to identify the capacity of the plurality of communication channels, based on a bandwidth of the plurality of communication channels and the number of external electronic devices connected to respective communication channels from the plurality of communication channels.

12. The positioning system of claim 9, wherein the electronic device is further configured to identify the precision of the plurality of communication channels based on a strength of a signal of respective communication channels of the plurality of communication channels.

13. The positioning system of claim 9, wherein the electronic device is further configured to:
identify one or more channels having a respective capacity of a specified value or greater from the plurality of communication channels, and
determine a channel from the one or more channels having a highest precision as the communication channel to be used for determining the location of the mobile terminal.

14. The positioning system of claim 9, wherein the at least one communication device comprises:
a first communication device comprises a UWB module;
a second communication device comprises a BLE module; and
a third communication device comprises a Wi-Fi module, and
wherein the communication channels comprise:

a first communication channel established by the first communication device;
a second communication channel established by the second communication device; and
a third communication channel established by the third communication device.

15. The positioning system of claim 9, wherein the electronic device is further configured to:
transmit information related to the mobile terminal to a communication device corresponding to the determined communication channel,
transmit information related to the determined communication channel to the mobile terminal, and
determine the location of the mobile terminal through the determined communication channel.

16. The positioning system of claim 15, wherein the electronic device is further configured to:
store information related to a communication signal corresponding to a location,
obtain information related to a signal of the determined communication channel from the mobile terminal, and
determine the location of the mobile terminal, based on the stored information related to the communication signal corresponding to the location and the information related to the signal of the determined communication channel obtained from the mobile terminal.

17. The positioning system of claim 15, wherein the mobile terminal is configured to display the information related to the determined communication channel, based on the information related to the determined communication channel obtained from the electronic device.

18. The positioning system of claim 17, wherein the mobile terminal is further configured to display information for requesting selection of an optimal communication channel in response to the determined communication channel being different from a communication channel selected by the mobile terminal for the positioning system.

19. The positioning system of claim 17, wherein the mobile terminal is further configured to display information for requesting activation of a communication module corresponding to the determined communication channel in response to the communication module being inactive.

20. The positioning system of claim 19, wherein the electronic device is further configured to:
transmit information related to the mobile terminal to the communication device corresponding to the another communication channel,
transmit information related to the another communication channel to the mobile terminal, and
determine the location of the mobile terminal through the another communication channel.

21. A method for determining an indoor position of a mobile terminal, the method being executed by one or more processors, the method comprising:
identifying a plurality of communication channels supported by the mobile terminal, wherein the plurality of communication channels comprise at least two channels performing data exchange through different types of wireless communication;
identifying at least one of a respective capacity of the plurality of communication channels or a respective precision of the plurality of communication channels; and
determining a communication channel to be used from the plurality of communication channels for determining the indoor position of the mobile terminal, based on an identification result; and determining another communication channel to be used for determining the location of the mobile terminal in response to one of:

a change in the number of external electronic devices connected to the determined communication channel when identification result is based on the capacity of the plurality of communication channels, or a change in a strength of signal of the determined communication channel when the identification result is based on the precision of the plurality of communication channels.

22. The method of claim 21, further comprising:

determining the indoor position of the mobile terminal based on the determined communication channel, wherein determining the indoor position of the mobile terminal comprises:

obtaining, from the mobile terminal, information related to a signal of the determined communication channel;

determining the indoor position of the mobile terminal based on the information related to the signal of the determined communication channel obtained from the mobile terminal and information related to a communication signal corresponding to a location.

23. The method of claim 21, wherein determining the communication channel to be used comprises:

identifying one or more capable channels having a respective capacity of at least a predetermined value from the plurality of communication channels; and determining the communication channel to be used as a precise channel having a highest precision from the one or more capable channels.

24. The method of claim 21, wherein at least one of the different types of wireless communication is an ultra-wideband wireless communication.

* * * * *